US006954738B2

(12) United States Patent
Wang et al.

(10) Patent No.: US 6,954,738 B2
(45) Date of Patent: Oct. 11, 2005

(54) METHOD AND APPARATUS FOR DISTRIBUTING ENFORCEABLE PROPERTY RIGHTS

(75) Inventors: Xin Wang, Torrence, CA (US); Bijan Tadayon, Germantown, MD (US); Thomas DeMartini, Culver City, CA (US); Michael Raley, Downey, CA (US); Guillermo Lao, Torrance, CA (US); Eddie Chen, Rancho Palos Verdes, CA (US); Charles P. Gilliam, Darien, CT (US)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

(21) Appl. No.: 10/724,076

(22) Filed: Dec. 1, 2003

(65) Prior Publication Data

US 2004/0111694 A1 Jun. 10, 2004

Related U.S. Application Data

(63) Continuation of application No. 10/159,272, filed on Jun. 3, 2002, and a continuation-in-part of application No. 10/046,695, filed on Jan. 17, 2002.
(60) Provisional application No. 60/331,625, filed on Nov. 20, 2001, provisional application No. 60/296,117, filed on Jun. 7, 2001, provisional application No. 60/296,118, filed on Jun. 7, 2001, provisional application No. 60/296,113, filed on Jun. 7, 2001, and provisional application No. 60/261,753, filed on Jan. 17, 2001.

(51) Int. Cl.⁷ ............................ G06F 17/60; H04K 1/00
(52) U.S. Cl. .................. 705/59; 705/1; 705/50; 705/51; 705/54; 713/200; 713/201; 380/200; 380/201; 380/202; 380/203; 380/204

(58) Field of Search ......................... 705/1, 50, 51–55; 713/200–201; 380/200–204

(56) References Cited

U.S. PATENT DOCUMENTS

| | | | |
|---|---|---|---|
| 5,311,591 A | * | 5/1994 | Fischer ........................ 713/156 |
| 5,499,298 A | | 3/1996 | Narasimhalu et al. |
| 5,673,316 A | | 9/1997 | Auerbach et al. |
| 5,794,207 A | | 8/1998 | Walker et al. |
| 5,892,900 A | * | 4/1999 | Ginter et al. ............... 713/200 |
| 5,917,912 A | | 6/1999 | Ginter et al. |
| 2003/0208447 A1 | * | 11/2003 | Stefik et al. .................. 705/51 |

FOREIGN PATENT DOCUMENTS

| | | |
|---|---|---|
| EP | 0 715 244 A1 | 6/1996 |
| WO | WO 00/08909 | 2/2000 |
| WO | WO 00/39733 | 7/2000 |

OTHER PUBLICATIONS

International Search Report Dated Feb. 11, 2004.
International Search Report Dated Feb. 13, 2004.

* cited by examiner

Primary Examiner—James P. Trammell
Assistant Examiner—Kambiz Abdi
(74) Attorney, Agent, or Firm—Marc S. Kaufman; Nixon Peabody, LLP (57) ABSTRACT

An enforceable property right and a system for controlling the manner of use of an item in accordance with usage rights. The enforceable property right includes an item ticket having a security mechanism incorporated therein and specifying an item for which the item ticket can be redeemed and a license associated with the item ticket. The license includes usage rights specifying a manner of use for redeeming the item ticket and a mechanism for unlocking said security mechanism.

49 Claims, 4 Drawing Sheets

METHOD AND APPARATUS FOR DISTRIBUTING ENFORCEABLE PROPERTY RIGHTS

RELATED APPLICATION DATA

The present application is a continuation application of commonly-assigned, co-pending, U.S. patent application Ser. No. 10/159,272, filed Jun. 3, 2002, which claims benefit from U.S. Provisional Patent Application Ser. Nos. 60/331,625, filed on Nov. 20, 2001, 60/296,117, filed on Jun. 7, 2001, 60/296,118 filed on Jun. 7, 2001, and 60/296,113 filed on Jun. 7, 2001, and which is a continuation-in-part of U.S. patent application Ser. No. 10/046,695, filed on Jan. 17, 2002, which claims benefit of U.S. Provisional Patent Application Ser. No. 60/261,753, filed on Jan. 17, 2001, the entire disclosures of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980 disclose DRM systems addressing these issues.

For example, U.S. Pat. No. 5,634,012, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use of the content such as, viewing only, use once, distribution, and the like. Usage rights can be contingent on payment or satisfaction of other conditions and variables.

As noted above, it is known to control the use and distribution of digital content, i.e. documents or other information that can be rendered by a computer or other device, using usage rights and conditions. This permits digital content to be distributed in a flexible manner while protecting the rights of the content owner and permitting the content owner, and others adding value to transactions, to produce a revenue stream from the distribution. However, tangible items, such as goods and services. Cannot be distributed in such a flexible manner.

It is known to utilize auctions, reverse auctions, aggregation mechanisms, and other distribution models to distribute goods and services in a more flexible manner. For example, U.S. Pat. No. 5,897,620 discloses a system for matching a destination and unspecified-time with an airline flight to permit airlines to fill otherwise empty seats. However, the system disclosed in this patent merely matches a traveler with an airline ticket and does not permit the flexible distribution of various services and goods.

U.S. Pat. No. 6,041,308 discloses a system for encouraging buyers to submit Conditional Purchase Offers (CPOs) to a CPO management system for a desired product. The CPO management system processes each received CPO to determine whether one or more sellers are willing to accept a given CPO. While this system can be applied to more diverse goods and services, the system also is merely a mechanism for matching buyers to sellers.

Notwithstanding new business models and approaches, such as those discussed above, to selling various goods and services, the sale and exchange of goods and services still relies on legal theories and relationships for enforcing behavior. For example, the parties to each transaction ultimately have to agree, either directly or indirectly, on the parameters for delivering the goods and services, such as price, quantities, the item identity and the like. Accordingly, trade of goods and services is restrained by legal and relationship issues.

SUMMARY OF THE INVENTION

A first aspect of the invention is an enforceable property right for use within a system for controlling the manner of use of an item in accordance with usage rights. The property right comprises an item ticket specifying an item for which the item ticket can be redeemed, the ticket having a security mechanism incorporated therein and a license associated with the item ticket. The license includes usage rights specifying a manner of use for redeeming the item ticket and means for unlocking said security mechanism.

A second aspect of the invention is system for enforcing property rights in items by controlling the use of the items in accordance with usage rights. The system comprises a license device operative to associate a license with an item ticket specifying an item for which the item ticket can be redeemed and having a security mechanism incorporated therein. The license includes usage rights specifying a manner of use for redeeming the item ticket and conditions for exercising the manner of use. A security component is operative to enforce the license and unlock the security mechanism when the conditions are satisfied.

A third aspect of the invention is a method for enforcing a property right within a system for controlling the manner of use of an item in accordance with usage rights. The method comprises parsing a license associated with an item ticket specifying an item for which the item ticket can be redeemed and having a security mechanism incorporated therein. The license includes usage rights specifying a manner of use for redeeming the item ticket and conditions for exercising the manner of use. The method also comprises determining if the conditions are satisfied and unlocking the security mechanism if the conditions are satisfied.

BRIEF DESCRIPTION OF THE DRAWING

The invention is described through a preferred embodiment, examples, and the attached drawing in which.

DETAILED DESCRIPTION

Figure 1:
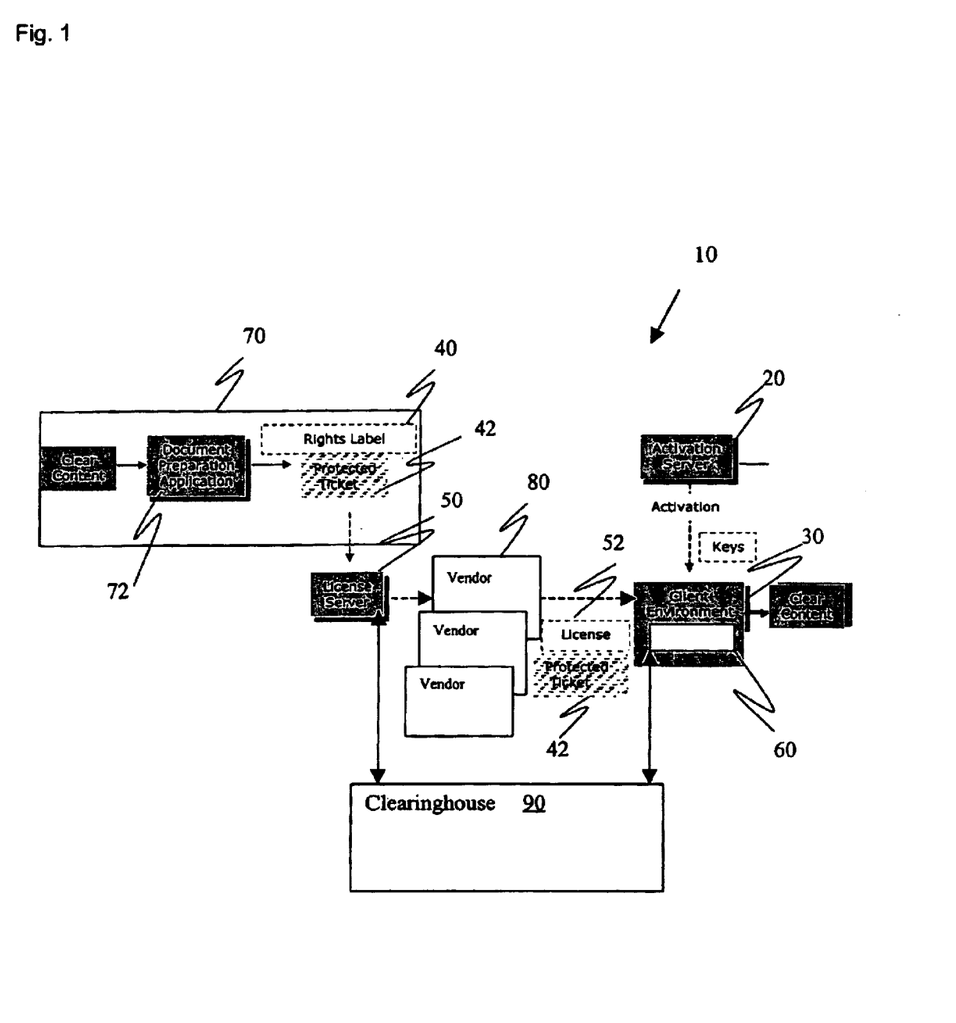
FIG. 1 is a block diagram of a computer architecture of the preferred embodiment of a distribution system.

A rights management system can be utilized to specify and enforce property rights to specific items, such as content, goods, services, or other items. Applicants have developed the concept of an "enforceable property right", i.e., a right to use a specified item in accordance with usage rights associated with the item. The phrase "usage rights' as used herein refers to a declarative specification of a manner of use that is identifiable and enforceable through a software mechanism. FIG. 1 illustrates system 10 that can be used in connection with the preferred embodiment. System 10 includes a user activation module, in the form of activation server 20, that issues public and private key pairs to users in a protected fashion, as is well known. During an activation process, some information is exchanged between activation server 20 and client environment 30, a computer or other device associated with a user, for example, and client component 60 is downloaded and installed in client environment 30. Client component 60 preferably is tamper resistant and contains the set of public and private keys issued by activation server 20 as well as other components such as any necessary engine for parsing or rendering item ticket 42. Item ticket 42 specifies a specific item as described below.

Rights label 40 is associated with item ticket 42 and specifies usage rights and possibly corresponding conditions that can be selected by an end-user. License Server 50 manages the encryption keys and issues licenses 52 for exercise of a property right in the manner set forth below. Licenses 52 embody the actual granting of usage rights to an end user based on usage rights selected from rights label 40. For example, rights label 40 may include usage rights for redeeming item ticket 42 for an item upon payment of a fee of five dollars and redeeming or distributing item ticket 42 upon payment of a fee of ten dollars. Client component 60 interprets and enforces the usage rights that have been specified in license 52.

Figure 2:
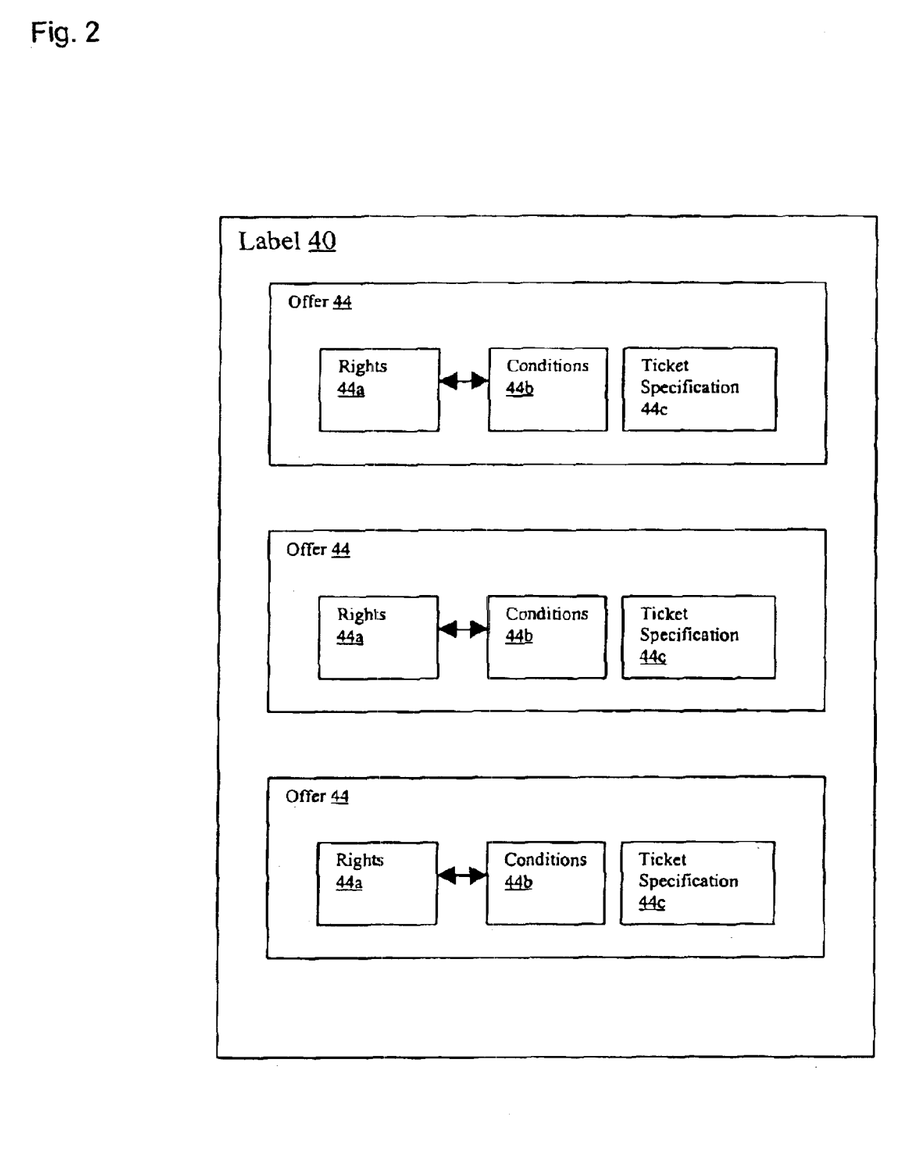
FIG. 2 is a schematic illustration of a rights label in accordance with the preferred embodiment.

FIG. 2 illustrates rights label 40 in accordance with the preferred embodiment. Rights label 40 includes plural rights offers 44. Each rights offer 44 includes usage rights 44a, conditions 44b, and ticket specification 44c. Ticket specification 44c can include any mechanism for referencing, calling, locating, or otherwise specifying item ticket 42 associated with rights offer 44.

Figure 3:
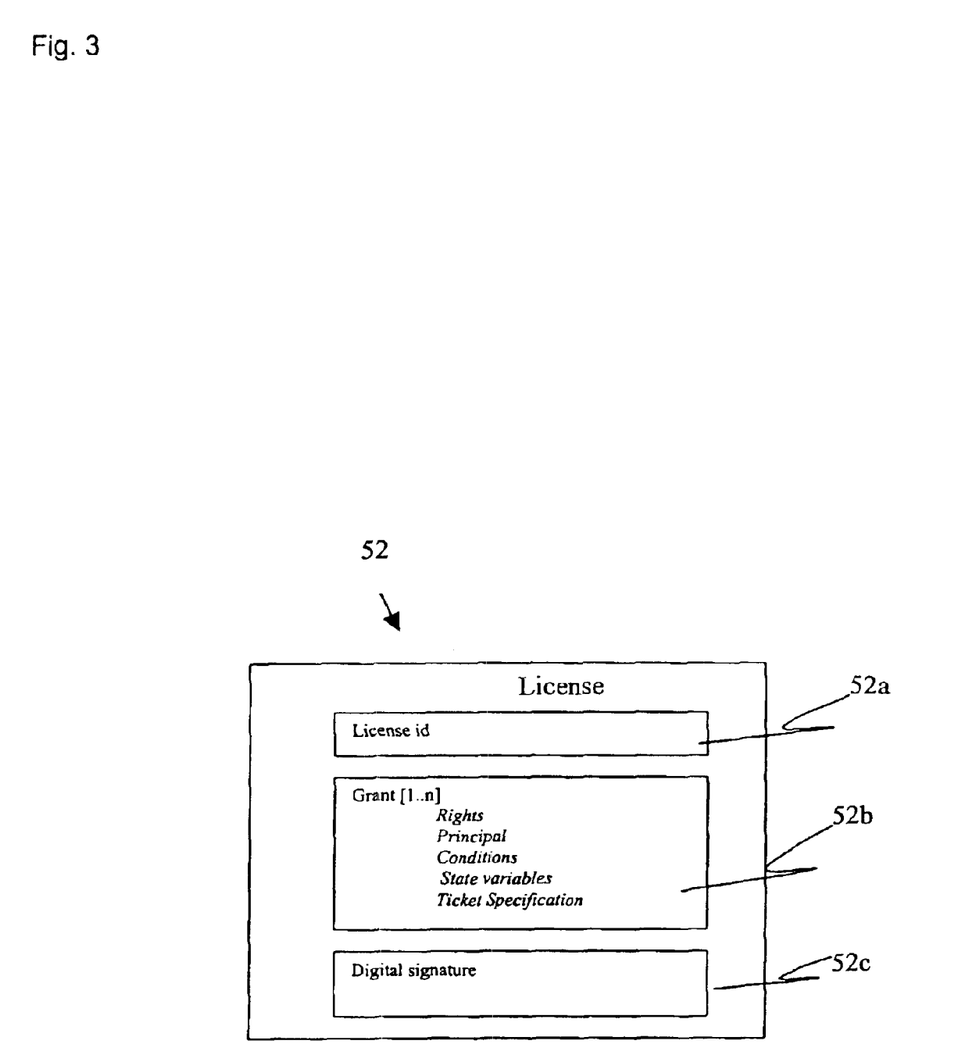
FIG. 3 is a schematic illustration of a license in accordance with the preferred embodiment.

FIG. 3 illustrates license 52 in accordance with the preferred embodiment. License 52 includes a unique license ID 52a and grant 52b including usage rights, a principal, conditions, state variables, and a ticket specification designating an associated ticket 42. License 52 also includes digital signature 52c including any cryptographic keys or the like for unlocking item ticket 42.

Usage rights, specify manners of use. For example, a manner of use can include the ability to use an item in a specified way for a specified period of time, to buy the item for a specified period of time, or the like. Usage rights can also be bundled. Further, usage rights can specify transfer rights, such as distribution rights and can permit granting of usage rights to others or the derivation of usage rights. Such usage rights are referred to as "meta-rights". Meta-rights are the rights that one has to manipulate, modify, and/or derive other usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

Often, conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities or can be combined. As will become apparent below, in the preferred embodiment, some conditions must be satisfied in order to render item ticket 42 or otherwise convert item ticket 42 into a form that is redeemable for the item. Other conditions can be expressed on ticket 42 in redeemable form. Such conditions are referred to as "post license" conditions below.

State variables track potentially dynamic states conditions. State variables are variables having values that represent status of an item, usage rights, license or other dynamic conditions. State variables can be tracked, by clearinghouse 90 or another device, based on identification mechanisms in license 52 and ticket 42. Further, the value of state variables can be used in a condition. For example, a usage right can be the right to redeem item ticket 42 for specified goods and a condition can be that the usage right can be exercised three times. Each time the usage right is exercised, the value of the state variable is incremented. In this example, when the value of the state variable is three, the condition is not longer satisfied and ticket 42 cannot be redeemed. Another example of a state variable is time. A condition of license 52 may require that item ticket 42 is redeemed within thirty days. A state variable can be used to track the expiration of thirty days. Further, the state of a usage right can be tracked as a collection of state variables. The collection of the change is the state of a usage right represents the usage history of that right.

Item ticket 42 can be prepared with document preparation application 72 installed on computer 70 associated with the distributor of an item, a content service provider, or any other party. Preparation of item ticket 42 consists of specifying the rights and any conditions or state variables values under which item ticket 42 can be redeemed. Rights label 40 is associated with item ticket 42 and item ticket 42 with is protected with some crypto algorithm or other mechanism for preventing processing or rendering of item ticket 42. A rights language such as XrML™ can be used to specify the rights and conditions in and state variables rights label 40. However, the rights and conditions can be specified in any manner. Accordingly, the process of specifying rights refers to any process for associating rights with a ticket. Rights label 40 associated with item ticket 42 and the encryption key used to encrypt item ticket 42 can be transmitted to license server 50.

Figure 4:
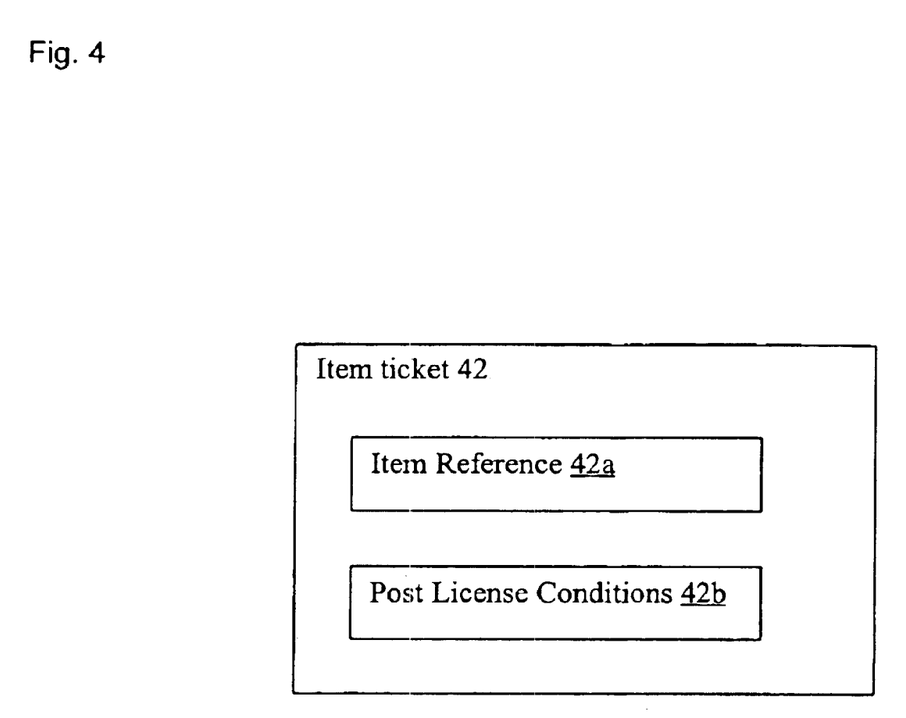
FIG. 4 is a schematic illustration of a ticket in accordance with the preferred embodiment.

Item ticket 42, with the security mechanism unlocked, can be a human readable or computer readable coupon, a code, a document, or the like. Accordingly, the phrase "item ticket" as used herein, refers to any tangible or intangible indication of an item. Ticket 42 specifies one or more items and thus usage rights and conditions can be associated with any item including, objects, classes, categories, and services, for which use, access, distribution, or execution is to be controlled, restricted, recorded, metered, charged, or monitored in some fashion. Item ticket 42 and license 52 thus define a property right. In the preferred embodiment, item ticket 42 can be linked to the item through an item reference. The term "linked" as used herein refers to any type of association, such as a description, a pointer, or the like. For example, the ticket can include a unique code associated with an item through a database record. When the code is presented to a vendor, the database is searched and the corresponding item can be delivered. Item ticket 42 can also include a human readable description of the item and any post license condition not yet satisfied. For example, if a condition in license 52 is that item ticket 42 must be redeemed at a certain location or time, that condition can be parsed and transferred to item ticket 42. As illustrated in FIG. 4, item ticket 42 includes item reference 42a to specify the item and post license conditions 42b.

A typical workflow for DRM system 10 is described below. A user operating within client environment 30 is activated for receiving item ticket 42 by activation server 20. This results in a public-private key pair (and some user/machine specific information) being downloaded to client environment 30 in the form of client software component 60 in a known manner. This activation process can be accomplished at any time prior to the issuing of license 52.

Usage rights, conditions, and state variables of license 52 can be stored together with item ticket 42 or otherwise associated with item ticket 42. For example item ticket 42 can include a reference to usage rights stored elsewhere. When a user wishes to obtain a specific enforceable property right to an item, the user makes a request for item ticket 42 specifying the item through item reference 42a. For example, a user might browse a Web site running on Web server of vendor 80, using a browser installed in client environment 30, and request an item corresponding to item ticket 42, i.e. an item specified in item reference 42a of item ticket 42. The user can examine rights offers 44 in rights label 40 associated with item ticket 42 and select the desired usage rights and conditions. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for item ticket 42 and Web server 80 downloads both item ticket 42 and the license 52. As noted above, license 52 includes usage rights and conditions selected from rights label 40 of item ticket 42 and can be downloaded from computer 70 associated with a vendor, distributor, or other party. Keep in mind that item ticket 42 is secured, through encryption or another security mechanism and can only be rendered or otherwise accessed through license 52 which includes a mechanism for unlocking ticket 42. Mechanisms for controlling access to documents are well known.

Client component 60 in client environment 30 will then proceed to interpret license 52 and allow rendering or other access of item ticket 42 based on the rights and conditions specified in license 52. The interpretation and enforcement of usage rights and related systems and techniques are well known. The steps above may take place sequentially or approximately simultaneously or in various sequential order. For example, if license 52 is for purchase of an item at a price of ten dollars within one month of the issue date of item ticket 42, client component 60 could render item ticket 42a as a displayable or printable coupon for such a purchase expiring in one month the price an expiration data are post license conditions in this example. In other words, such conditions can be set forth on the rendered, or otherwise unlocked, form of item ticket 42 and can be discerned upon redemption of item ticket 42.

System 10 addresses security aspects of tickets 42. In particular, system 10 may authenticate license 52 that has been issued by license server 50. One way to accomplish such authentication is for application 60 to determine if license 52 can be trusted. In other words, application 60 has the capability to verify and validate signature 52c, such as a cryptographic signature, or other identifying characteristic of license 52 in a known manner. Of course, the example above is merely one way to effect a rights management system. For example, license 52 and item ticket 42 can be distributed from different entities. Clearinghouse 90 can be used to process payment transactions and verify payment prior to issuing a license. Further, various workflows can be used and various parties can be involved. Also, various devices and architectures can be used to accomplish the workflows.

As noted above, a distributor or other party associates rights label 40, with item ticket 42. Rights label 40 can be registered with clearinghouse 90 and stored in a repository, such as a memory device associated with clearinghouse 90. Item ticket 42 can be stored in a ticket repository, such as a storage device associated with the distributor. Alternatively, rights label 40 and item ticket 42 can be stored on the same device and can even be in a single common file.

The private key, or other identification information, is issued to the user upon purchase of license 52. Payment for the item is passed from the user to license server 50 or other party by way of clearinghouse 90 which collects requests from the user and from other users who wish to purchase a property right in specific items. Clearinghouse 90 can also collect payment information, such as debit transactions, credit card transactions, or other known electronic payment schemes, and forward the collected payments as a payment batch to the ultimate provider of the item. Of course, clearinghouse 90 may retain a share of the payment and the distributor may retain a portion of the batch payment from and forward a payment to the item provider. Clearinghouse 90, determines the payment made to parties in the revenue stream of the item. Clearinghouse 90 can serve as transaction aggregator which functions to aggregate plural transactions over a period of time, and charge parties in an appropriate manner to reduce the accounting overhead.

For example a user could request item ticket 42 corresponding to a desired item through Web server 80 and provide information, such as credit card and charge authorization information, personal information, or the like to permit clearinghouse 90 to satisfy conditions specified in license 52 associated with item ticket 42. Authorization identification, such as a private key, obtained from activation server 20 will also be submitted. Significantly license 52 permits item ticket 42 to be decrypted, or otherwise allows the security mechanism thereof to be unlocked, and used in accordance with the usage rights in license 52.

As noted above item ticket 42 can specify any item and, when combined with usage rights selected from rights label 40 and embodied in license 52, represents an enforceable property right that can be exercised by redeeming item ticket 42. Redemption of item ticket 42 can include presenting a rendered coupon or code to a vendor electronically or physically. However, redemption of item ticket 42 can take various forms and include various processes. Therefore, the term "redeem," as used herein, refers to any process or mechanism by which item ticket 42 is converted to access an item. Several example of enforceable property rights are set forth below.

One example relates to a stock (or other market) exchange. For example, the property right can be the right to buy or sell a security in advance or at a threshold. Item ticket 42 can specify 1000 shares of stock of a specific company in item reference 42a. The right to by the stock between two thresholds, at a specified future time, or the like can be specified by usage rights and conditions. Item ticket 42 could also specify a margin call, the ability to change the type of stock (common/preferred), or the ability to convert stock options to regular stock. Also, there may be usage rights associated with the stock during the bankruptcy proceedings, as to who can liquidate first and in what manner. The condition of "during bankruptcy" and the status of other parties, such as creditors, can be expressed as state variables.

In an example related to real estate, a property right to real property can be expressed as, for example, joint-tenant or tenant-in-common with the option to convert to other options and with change of the percentage of the ownerships, and designation of the survivorship option. All of these ownership rights can be expressed as usage rights and the real property can be specified in item reference 42a of item ticket 42.

Further item reference 42a of item ticket 42 can specify professional services. For example, a user can buy the right to visit a specific dentists' office, or one of plural dentists' office in an association, for a period of 1 year, while paying only a fixed or variable co-payment for each visit, up to a maximum amount. Or, item ticket 42 can specify a lawyer or an accountant and usage rights and conditions can specify a period of time, a fixed number of times, or a specific project or issue to which use of the item is limited. Item reference 42a can specify the right for services offered by an organization, in advance, including the rights associated with the intellectual property, such as patents, copyright, and trademarks. This can apply to software programmers, customer service representative, training services, or other technical or non-technical services.

A user can obtain a property right and later sell that property right to a third-party, if such transfers are authorized by usage rights of license 52 associated with item ticket 42. This impacts mobility and liquidity to different types of assets, making it possible to expand the market concept to include property rights to any item. Another example of property right is where item ticket 42 defines a coupon, gift-certificate, rain-check, exchange certificate, return, authorization or the like, where rights and conditions of license 52 are associated with the redemption thereof. For example, a coupon can be rendered only after the conditions are satisfied. Alternatively, post license conditions can be expressed in the rendered coupon.

Another example relates to any type of financial account or transaction such as certificates of deposit, checking accounts, wires, e-mails, fund transfers, currency exchanges, locks on current or future interest rates, points or other fees paid for a loan, bonds, loans, secondary loans, and stocks (any of which may have one or more attributes such as maturity dates or deadlines). Item reference 42a can specify any of these items and license 52 can specify rights and conditions associated with the access to these item.

Another example includes the right for future tangible or intangible things such as books (in printed or electronic form) or music (on physical media or electronic form). The usage rights and conditions of license 52 limit the right to during or after a period of time or for a predetermined number of units, such as units of CDs or books.

In another example, the property right includes the rights expressed for a will or a trust for the distribution of property or other assets, or for the provision of rights, services or benefits for persons, entities and other things that are specified by item reference 42a. Access can be restricted to certain parties, or in any other way, by usage rights and conditions.

The property right can include online services. For example, diet and vitamin calculations (customized based on an individual's characteristics and data), stock quotations, interest rate and mortgage payment calculations, credit rating, background checks, loan application and approval, on-line banking, investment advice, translation services, graphic design, advertisement services, currency conversion and exchange, and job placement can all be specified by item reference 42a of item ticket 42. In such a case, item ticket 42 can include an access code to the online service or the like that is usable only after conditions of license 52 have been satisfied.

In the preferred embodiment, a provider of items, or another specified party, specifies the conditions for access to the items. A user wishing to obtain a property right in the item has to satisfy those conditions. This concept works equally well, regardless of the direction or order in which information moves. For example, a user can supply conditions to the supplier in license 52 and the supplier has to satisfy those conditions to make a sale. Furthermore, a partial satisfaction of conditions could result in a property right or other result, which may be the same or different when compared to full satisfaction of the conditions.

The item can be access to a Web site. As a condition of access to the Web site, license 52 can include the condition that the user must be located in a specific geographical area (for example in the United States). This is useful for localization of the web site, for example, in terms of language translation, customization, or other aspects at the property right, including local customs, news, culture, hobbies, local sport news, local news makers, local industry, local merchandise, or local advertisements. For example, if the user is located in the United States, the language will be English and American versions of spelling and dialect will be used. Further advertisements can be based on American taste, season, or political climate at that moment. Localization increases the appeal of the Web site, facilitates provision of appropriate property rights and generally, improves customer satisfaction and traffic of the web site or volume of sale.

Another benefit is that the property owner may want to release a specific property right in the United States first, and three months later in Europe or another part of the world. This is common in movie industry, where the different releases in different geographical areas are restricted based on a time schedule designed to give maximum benefit to the owner or other recipient of revenue. The release dates and/or time tables can all be incorporated into a rights template, so that the assignment or modifications of the time table would be easy for the content owner, and keeping track of the various times can be done automatically, without further human intervention.

Another example is when a "Web crawler" collects data from a Web site. The Web master or other authority in control of the Web site could, as a condition of access to the Web site, require the crawler to access or request the access after midnight when the Web site traffic is at a minimum, and therefore, loads are reduced. Additionally, the web site could impose varying conditions on the ability or right of the Web crawler to access the site, such as by specifying that the access will time out after a certain period of time, if access is obtained during peak hours.

Furthermore, license 52 can specify how to gain access to a property right. For example, one can specify how a user may distribute content or other items (for example, by super-distribution). This gives more control to the content owner, as to where and by what method the distribution is conducted. The geographical location restriction is one condition. The parameters of super-distribution could also be specified by the content owner as conditions, to further limit the method of distribution for example of expiration date, the number of copies, and the people forbidden to get a copy (such as unfriendly customers, or known hackers) can be specified as conditions.

Or, one user may want to share their personal calendar with others. Access to the calendar can be the item specified in item reference 42*a* which can include an access code. However, as a condition of license 52, the user may require the accessing party to do a specific task. For example, a condition may require the user to open one specific file or share their own calendar. The calendar can be used and edited by all some of the others, who have the right to input, modify, or edit, as expressed in usage rights of license 52. Some of the parties may have the right to view-only, or view-and-input-only, with no modification rights. The calendar can keep track of conflict of schedules for two or more people, and automatically notify the conflicting parties or all of the parties about the conflict. The calendar can also highlight the unavailable days, when one or more parties are out of town or unavailable for other reasons. The calendar can also suggest some days or hours that the calendar is relatively empty, or for a specified parties, find the common acceptable dates or hours, based on the input by one or more users.

Another example of a property right that can be controlled is access to a print-shop service, where one can specify some policy to restrict the access of users to printing services specified by item ticket 42. In other words, access to the service is specified in item reference 42*a* and restrictions are expressed as usage rights and conditions of license 52. For example, the user may send a large file to be printed by the print shop, for a fee. However, as a way of managing job orders, smaller files get printed sooner, i.e., have a higher priority. The size of the files within a predetermined time frame can be compared and ordered for printing purposes. In other words, a condition of license 52 is that no smaller files are queued for printing. The status of other files qued for printing can be tracked as a state variable. However, if a job must be printed before a deadline, then the length of the printing process is estimated, and the job schedule is modified to make the deadline. This out-of-order prioritization can be signified by a flag or a variable (or set of variables/ parameters), i.e., which contains the order of priority, the information about the deadline, or the like. In the case of the conflict of the schedules or having not enough time to satisfy all the deadlines, the jobs in a class with a higher priority will be handled before the other jobs. Thus, the size of a file to be printed is important only within a specific class of priority.

Further, upon payment of a fee or satisfaction of another condition, a print job might jump the queue, or color jobs and black and while jobs could be routed to different printers, or the user may specify the priority he desires based on the fee paid. For assignment of print jobs, priority assignment, class of print jobs, negotiating the prices and fees, and the moving of priorities, one can assign rights to customers and print jobs, and express those rights in license 52.

As a service provider, one can set conditions for quality in rights lable 40. For example, lower quality image can be purchased for a lower fee or a slower delivery can be granted for a lower fee. For example, the resolution can be corresponded to the price, based on a table, a formula, a function, or values on a curve. This applies to variations other than quality such as, speed or timing, and the variation could be based on conditions other than fee paid. Each of these services or items can be specified in item reference 42*a*.

Another possible property right is the authority to change or set the time for a computer or other system. In such an example, the condition is the identification of the person as the system administrator. Thus, the identification can be based on the role of the individual, which can be established by a smart card, ID, or the like. Such a role-based model makes it easier to effect a change in the right assignment or a change in the position of the individuals.

Further applying usage rights to items is very useful for situations in which the item provider is not the same as the item seller, such as for air fares and car rentals in which a travel agent or other party often sells the item. For example, one can buy one or more round-trip tickets between Boston and Chicago from a Web site, such as an auction site, a reverse-auction site, airline direct sales, a travel agency, an individual having the property right to transfer or resell the tickets, a clearinghouse, a reseller, or a distributor. The destination, the location, or both could be variables. For example, an item specified in item reference 42*a* of item ticket 42 can an airline ticket from Boston to any city in the Eastern part of the United States, any city within 2000 miles of Boston, or to any city in the continental United States. The usage rights of license 52 can include the right to exchange the ticket for another ticket within the European continent provided that condition, such a payment of a fixed or variable fee is paid. In addition, the usage rights can include the right to convert the ticket to cash, points, coupons, or the like, for purchase of merchandise or services from affiliated retailers. For busy seasons (predetermined time windows), the conditions may require an extra fee for a given property right. The predetermined times can be tracked as state variables.

As another example, item ticket 42 can specify that the user can rent a car for six days in Boston from any one of several car rental companies. The rental companies can have a contract with clearinghouse 90 to recognize item ticket 42 as valid and item reference 42*a* can specify the car rental. Usage rights and conditions can specify mileage limits, drop off locations, car size, car manufacturer, pick-up locations, or various equipment in the car as additional features. The item can be a rental of a car for six days within the month of August, as an example. The owner may not know exactly when or where they may be exercising the property right.

The concept of inventory of extra seats, for example, surplus tickets for movie seats, airline seats, or rental cars, in which there is not necessarily a one-to-one relationship, can also be adapted to distribution as a property right of an item with associated usage rights. For example, one can buy a property right to a movie ticket from a Web site, and exercise the property right by redeeming the corresponding item ticket 42 at a movie theater which accepts tickets 42 and has a relationship with the distributor Web site (similar to the relationship that MasterCard™ Corporation has with various issuing banks, with respect to customers and card holders, or even similar to a more centralized control, such as the one by American Express™ Cards). Thus, in general, there might be more than one type of distributors of rights, issuing entities, contract providers, or types of tickets 42, and each may have their own logos, terms, conditions, and associations, with possible reciprocal acceptances across boundaries of associations, for maximizing the acceptance areas and ease of use for customers, similar to ATM cards and banks. After honoring tickets 42, the theater owner can aggregate tickets 42 each day (for example), and obtain reimbursement.

Further, tickets or seats for events with undetermined dates or specifications can be expressed as items of property rights. Also, the item of the property right can be hotel rooms and other reserved commodities, whereby the reservations, become very liquid and exchangeable by permitting transfer of license 52 through usage rights or meta-rights.

Returning to the embodiment illustrated in FIG. 1, clearinghouse 90 can have a contract with three car rental companies as vendors 80, from which a user rents a compact car for 6 days in August, to be used in New York City. Item ticket 42 will be redeemable, to thereby exercise the property right of the license, from any of the three car rental companies. Usage rights of license 52 associated with item ticket 42 can specify various aspects of the property right such as; any six days in August of the current year in a specific city, the ability to auction or otherwise transfer the property right, the ability to exchange the city for a fee, or the ability to use part of the property right to obtain cash.

The flexibility in trading property rights permits various item to be extended into an open market for trading or exchanging property rights (similar to the NASDAQ stock market). In such a market rights become very liquid, similar to cash, stocks, bonds, or certified checks. Property rights can be traded as commodities or objects, with certain predetermined or variable values, at the current moment or in the future. Accordingly, associating rights and conditions with items, through the mechanism of license 52 and item ticket 42, provides a completely new dimension to trading of various goods and services.

Internet and computer networks provide a very fast and convenient way for the distribution of property rights to various items. However, distribution of some items may be strictly limited as specified by the item owner or as desired by the user. One example is a property right to view or use personal or private data. It may be desirable to restrict the manner of distribution, where it is distributed, who can use it, or who should not be able to inspect, copy, distribute, or use it. All of these restrictions can be specified as conditions and usage rights in license 52.

One can treat access to private information as an item, therefore, one can use rights management solutions to safeguard the private data. For example, a user may give their private personal data to a Web site, and the Web site may sell the data to others only if the user has given such a property right to the Web site. One parameter of the property right, expressed as a condition, can be the tolerance level of the content owner, as can be quantified, and be represented by an integer, a descriptive name, or other means. This tolerance value may correspond to geographical distribution limits, a list of authorized users, a list of unauthorized people (such as known hackers or infamous web sites), pre-defined levels of trust, levels of security for different web sites, pre-defined levels of privacy for different web sites, or other parameters or conditions. The parameters can be static or dynamically determined and can be tracked as state variables.

Web sites or other distribution sites can be rated by individuals, based on votes, or can be rated by commercial or non-profit organizations which rate the sites based on surprise audits, scheduled audits, and claims or rules set on the site, compared against the criteria of a rating organization. Ratings can be accomplished in any manner. The ratings can be a condition of license 52 to determine if the party can access the information. If there is an unwanted leak of the information to the outside, the liability of the site, in terms of monetary compensations or otherwise, can be stated as a parameter for the calculation of the rating of the web site.

A condition can be an indication if the content owner is willing to sell their own personal data. For example, license 52 granting access to a network or other service can have, as a condition, the requirement that the user grants permission to sell their personal data. Other conditions can be the price (or other compensation or conditions) set on the personal data. For example, the content owner could get a percentage or a fixed fee (or other benefit such as "airline miles") for each sale or transaction, of personal data. An aggregation of these micro-amounts can be paid at end of each month or other period, based on the usage rights parameters in the license. This can be done through one clearinghouse or multiple clearinghouses.

Personal data can be aggregated or averaged for economic, cultural, regional, national, medical or other reasons, in which the individual data for a specific person is not necessarily individually important. In such a case, the identity of individuals typically is not disclosed. The data may be used in the aggregate for any number of purposes, for example for a medical or census purposes by a non-profit or trusted organization. In these situations, conditions could specify the purpose of the collection of data, and usage rights could specify how this data is being used, such as aggregate or average only for example. Yet, another condition could specify which section or part of the collection of personal data is permitted to be used for the purpose. The specification could be done using a user interface, for example, in a template form, with flags specifying each piece of information. For example, for a medical study, permission may be granted to access the age, height, and weight of the person, but not the name, income, credit card number, credit history, or address. For a census or insurance study, the information accessible might include street address or zip codes, along with the number of the accidents in the past six months or the number of cars owned per household.

The content owner can specify that license 52 allows the data to be exchanged in a clearinghouse with another data collection entity, to average, aggregate, or simply sell or exchange the data. The content owner can verify the identity of the acquirer of the data, and the associated level of trust in the new owner, as conditions, on a case by case Licenses and ticket redemption can be tracked as state variables. As a user, one has to enter personal data only once and then, can maintain or keep track of the data. The user or other designated party can be informed of how the data, and which part of the data, is used. The user can be notified where the data is, by a tracking means such as sending e-mail messages back to the user. The user can also receive renumeration from the sale or use of personal data.

An item consisting of personal information can be divided into different components, for which different values of privacy condition can be assigned by the owner or another authorized person. Of course, the personal information could have just one component. Privacy parameters can be on any kind of a scale. For example, the typical scale for privacy parameter can be between 0 and 1. Zero signifies "no privacy" (non-conditional access to all), and one signifies "absolute privacy" (no access under any conditions). A set of rules can define the scale for the privacy parameter. Different constraints, conditions, fees, and rights can be associated with privacy parameters and each parameter, for a given component of personal information. The owner of content, an independent trusted organization, or someone else can set a trust ratings for different entities or persons, and trust ratings can be used as conditions of access of that entity or persons to particular information associated with a given privacy parameter. Trust ratings can be based on a scale that is similar to the scale for privacy parameters. For example, persons with the highest possible trust ratings can access information with the highest privacy parameters, and those with the lowest trust ratings could access only "no privacy" information. Middle ratings could access corresponding portions of information. Thus, generally, the content has a rating and the viewer or user has a rating, and a condition to access the content is that the two ratings have to correspond. The different parts of the content can also have different ratings, for greater flexibility.

Usage rights, rights offers, tickets and licenses described herein can be expressed by any language, format, tag set, set of rules, grammar, or formulations, such as the XrML™ language. Further, the various aspects and limitations can be expressed as various combinations of items, principals, and conditions. Consider the following example. A property right that specifies that "Person A can transmit a purchase order of less than X dollars to Company C." There are many possible ways to express the usage rights and conditions of this license to a property right. Some examples are set forth below. From these examples, it can be seen that a property right can be expressed in various ways. For example, restrictions can be set forth in the usage right, in the item, or as conditions.

EXAMPLE #1

Principal: Person A
Item: Company C Purchasing Service
Usage Right: Transmit
Conditions: type="Purchase Order", cost<X

EXAMPLE #2

Principal: Person A
Item: Purchase Order
Usage Right: Transmit
Conditions: recipient="Company C Purchasing Service", cost<X

EXAMPLE #3

Principal: Person A
Item: Any Goods from Company C
Usage Right: Purchase
Conditions: cost<X

EXAMPLE #4

Principal: Person A
Item: Any
Usage Right: Purchase
Conditions: recipient="Company C Purchasing Service", cost<X

EXAMPLE #5

Principal: Person A
Item: Any
Usage Right: Spend<$X
Conditions: recipient="Company C Purchasing Service"

EXAMPLE #6

Principal: Person A
Item: Purchase Order
Usage Right: Transmit to "Company C Purchasing Service"
Conditions: cost<X

EXAMPLE #7

Principal: Person A
Items: Purchase Order for "Company C Purchasing Service" costing less than $X total
Usage Right: Transmit
Conditions: none

EXAMPLE #8

Principal: Person A
Item: Any
Usage/Right: Purchase from Company C
Conditions: cost<X In general, one can specify how people use or access goods, services or other items through enforceable property rights. The owner item or distributor will have more control over the item and the user can have better management over what property rights are obtained and at what cost. The ability to create an enforceable property right in various items permits the items to be traded in an open market environment. While such an environment is known for commodities and stocks, it previously was not available for other goods and services. The various rights, conditions, items and other indicators can be expressed in any manner and can be stored at the same location or in different locations. For example, the ticket can be stored at one location, such as a user device, and the license can be stored at another location, such as a license server of other device. The various aspects of the preferred embodiment have individual utility and can exist separately. For example, licenses can exist separately from ticket, and each can exist outside of any specific computer architecture or system.

The system for distributing tickets and creating and enforcing licenses can utilize various devices, such as a personal computers, servers, workstations, PDA's, thin clients and the like. For example, the client environment can be a handheld device such as a mobile phone or a PDA. Various channels for communication can be used. Further, the various functions can be integrated in one device. For example, the license server function can be accomplished by software within the client environment. Further, the function of the license server or other modules for selecting rights and granting licenses can be accomplished in the same device as that used to access and redeem item tickets. The disclosed functional modules are segregated by function for clarity. However, the various functions can be combined or segregated as hardware and/or software modules in any manner. The various functions can be useful separately or in combination.

The various elements and portions thereof can be stored on the same device or on different devices. For example, a license can be stored together with, or separate from, an item ticket. Further, the various elements of a license can be stored on separate devices. For example the values of state variables can be stored in a state variable repository of a system that tracks the current value of state variables. Various links, references, specifications, and the like can be used to associate the elements.

The invention has been described through a preferred embodiment and examples. However, various modifications can be made without departing from the scope of the invention as define by the appended claims and legal equivalents.

What is claimed:

1. A method for enforcing a property right within a system for controlling a manner of use of an item in accordance with usage rights, the method comprising:
   obtaining an enforceable property right for a specific item, including obtaining an electronic item ticket specifying the specific item as an item for which the electronic item ticket is redeemed, the electronic item ticket having a security mechanism incorporated therein, and
   obtaining a digital license associated with the electronic item ticket, the digital license including usage rights specifying a manner of use for redeeming the electronic item ticket and conditions for exercising the manner of use;
   electronically parsing the digital license for usage rights and conditions;
   determining if the conditions are satisfied;
   if the conditions are satisfied, rendering or accessing the electronic item ticket through the digital license by unlocking the security mechanism of the electronic item ticket, and if the conditions are not satisfied, not allowing rendering or accessing of the electronic item ticket; and
   controlling the manner of use of the specific item by controlling the manner of use for redeeming the electronic item ticket in accordance with the determined usage rights,
   wherein the digital license includes post-license conditions that do not need to be satisfied for unlocking the security mechanism, and
   the method further comprises permitting a specification of the item and the post-license conditions to be rendered or accessed,
   wherein the digital license includes state variables.

2. The method as recited in claim 1, wherein the electronic item ticket includes a description of the item.

3. The method as recited in claim 1, wherein the electronic item ticket includes an ID correlated to the item.

4. The method as recited in claim 1, wherein the electronic item ticket includes limitations specified by the digital license.

5. The method as recited in claim 4, wherein the limitations are expressed as conditions.

6. The method as recited in claim 7, wherein the security mechanism is encryption and the unlocking step comprises executing a decryption algorithm.

7. The method as recited in claim 1, wherein the item includes goods.

8. The method as recited in claim 1, wherein the item includes services.

9. The method as recited in claim 1, wherein the digital license includes a specification of a corresponding electronic item ticket.

10. The method as recited in claim 1, wherein the item is information.

11. The method as recited in claim 10, wherein the digital license further comprises usage rights specifying access to the information and conditions of the access.

12. The method as recited in claim 11, wherein the conditions include a security or trust rating, and the determining step comprises determining if a users rating corresponds to the trust rating.

13. The method as recited in claim 7, wherein the item is an online service.

14. The method as recited in claim 13, wherein the digital license further comprises usage rights specifying access to the online service and conditions of the access.

15. The method as recited in claim 14, wherein the conditions include a security or trust rating, and the determining step comprises determining if a user's rating corresponds to the trust rating.

16. The method as recited in claim 1, wherein the usage rights include meta-rights which permit rights in the item to be granted to downstream parties and further comprising the steps of deriving rights form the meta-rights and generating a digital license including the derived rights.

17. The method as recited in claim 1, wherein the item is a financial instrument.

18. The method as recited in claim 1, wherein the item is a legal document.

19. The method as recited in claim 1, wherein the item is real estate.

20. The method as recited in claim 1, wherein the item is a tangible item comprising tangible goods or services, including a printed book, music on a physical media, an airline ticket, a car rental, or an event.

21. The method as recited in claim 1, wherein the item is an intangible item, comprising intangible goods or services, including an electronic book, or electronic music.

22. A system for enforcing property rights in items by controlling use of the items in accordance with usage rights, the system comprising:
   a license device operative to associate a digital license with an electronic item ticket, the electronic item ticket specifying an item for which the electronic item ticket is redeemed and having a security mechanism incorporated therein, the digital license including usage rights specifying a manner of use for redeeming the electronic item ticket and conditions for exercising the manner of use; and
   a client environment operative to obtain the electronic item ticket and the digital license and to control the manner of use of the item by including a security component operative to determine usage rights and conditions from the digital license, unlock the security mechanism of the electronic item ticket when the conditions are satisfied and not unlock the security mechanism of the electronic item ticket when the conditions are not satisfied, and enforce the usage rights of the digital license for the item for which the electronic item ticket is redeemed, wherein the digital license further includes condition that must be satisfied to activate the unlocking of the security mechanism.

the digital license includes post-license conditions that do not need to be satisfied for unlocking of the security mechanism.

the security component permits a specification of the item and the post-license conditions to be rendered or accessed, and the digital license includes state variables.

23. The system as recited in claim 22, further comprising an activation device for providing at least a portion of the security component of the client environment, wherein the security component is included in a user device.

24. The system as recited in claim 23, further comprising a vendor device for permitting a user to select an item and usage rights to be incorporated into the digital license generated by the license device.

25. The system as recited in claim 22, wherein the item is a tangible item comprising tangible goods or services, including a printed book, music on a physical media, an airline ticket, a car rental, or an event.

26. The system as recited in claim 22, wherein the item is an intangible item, comprising intangible goods or services, including an electronic book, or electronic music.

27. A computer readable medium including one or more computer readable instructions embedded therein for enforcing an enforceable property right for use within the system for controlling the manner of use of an item in accordance with usage rights, and configured to cause one or more processors to perform the steps of:

specifying via an electronic item ticket a specific item as an item for which the electronic item ticket is redeemed, the electronic item ticket having a security mechanism incorporated therein; and associating a digital license with the electronic item ticket, the digital license including usage rights specifying a manner of use for redeeming the electronic item ticket and means for unlocking the security mechanism, whereby the electronic item ticket is rendered or accessed through the unlocking means of the digital license, if the conditions are satisfied, and whereby the electronic item ticket is not allowed to be rendered or accessed, if the conditions are not satisfied, wherein the manner of use of the specific item is controlled by controlling the manner of use for redeeming the electronic item ticket in accordance with the determined usage rights, wherein the digital license further includes condition that must be satisfied to activate the means for unlocking.

the digital license includes post-license conditions that do not need to be satisfied to activate the security mechanism.

the unlocking mechanism permits a specification of the item and the post-license conditions to be rendered or accessed, and the digital license includes state variables.

28. The computer readable medium as recited in claim 27, wherein the electronic item ticket includes a description for the item.

29. The computer readable medium as recited in claim 27, wherein the electronic item ticket includes an ID correlated to the item.

30. The computer readable medium as recited in claim 27, wherein the electronic item ticket includes limitations specified by the digital license.

31. The computer readable medium as recited in claim 27, wherein the limitations are expressed as conditions.

32. The computer readable medium as recited in claim 27, wherein the security mechanism is encryption.

33. The computer readable medium as recited in claim 27, wherein the item includes goods.

34. The computer readable medium as recited in claim 27, wherein the item includes services.

35. The computer readable medium as recited in claim 27, wherein the digital license includes a specification of a corresponding electronic item ticket.

36. The computer readable medium as recited in claim 27, wherein the item is information.

37. The computer readable medium as recited in claim 36, wherein the digital license further comprises usage rights specifying access to the information and conditions of the access.

38. The computer readable medium as recited 37, wherein the conditions include a security or trust rating.

39. The computer readable medium as recited in claim 27, wherein the item is an online service.

40. The computer readable medium as recited in claim 39, wherein the digital license further comprises usage rights specifying access to the online service and conditions of the access.

41. The computer readable medium as recited in claim 40, wherein the conditions include a security or trust rating.

42. The computer readable medium as recited in claim 27, wherein the unlocking mechanism is operative to permit the item ticket to be rendered as a human readable description.

43. The computer readable medium as recited in the claim 27, wherein the unlocking mechanism is operative to permit the electronic item ticket to be rendered as a computer readable code.

44. The computer readable medium as recited in claim 27, wherein the usage rights include meta-rights which permit rights in the item to be granted to downstream parties.

45. The computer readable medium as recited in claim 27, wherein the item is a financial instrument.

46. The computer readable medium as recited in claim 27, wherein the item is a legal document.

47. The computer readable medium as recited in a claim 27, wherein the item is real estate.

48. The computer readable medium as recited in a claim 27, wherein the item is a tangible item comprising tangible goods or services, including a printed book, music on a physical media, an airline ticket, a car rental, or an event.

49. The computer readable medium as recited in a claim 27, wherein the item is an intangible item, comprising intangible goods or services, including an electronic book, or electronic music.

* * * * *